United States Patent
Römhild

(10) Patent No.: US 7,030,359 B2
(45) Date of Patent: Apr. 18, 2006

(54) SENSOR DETECTING REFLECTED LIGHT AND METHOD FOR ITS MANUFACTURE

(75) Inventor: Dieter Römhild, Erfurt (DE)

(73) Assignee: CiS Institut für Mikrosensorik gGmbH, Erfurt (DE)

( * ) Notice: Subject to any disclaimer, the term of this patent is extended or adjusted under 35 U.S.C. 154(b) by 356 days.

(21) Appl. No.: 10/384,007

(22) Filed: Mar. 7, 2003

(65) Prior Publication Data

US 2003/0168580 A1  Sep. 11, 2003

(30) Foreign Application Priority Data

Mar. 7, 2002  (DE) ................ 102 09 931

(51) Int. Cl.
*G01D 5/34* (2006.01)
*H01L 25/18* (2006.01)

(52) U.S. Cl. .............. 250/214 R; 250/221; 430/314; 174/52.1

(58) Field of Classification Search ........... 250/214 R, 250/214.1, 216, 221, 222.1; 204/456, 550, 204/645; 257/53, 59, 432; 65/17.4; 356/444–446; 501/66, 67; 424/82.01; 385/147; 340/555–557; 430/17, 314; 174/52.1
See application file for complete search history.

(56) References Cited

U.S. PATENT DOCUMENTS

| 3,258,521 A | * | 6/1966 | Josef et al. ................ 174/52.1 |
| 3,341,330 A | * | 9/1967 | Foris ........................... 430/17 |
| 4,309,605 A | | 1/1982 | Okabe |
| 4,340,813 A | * | 7/1982 | Sauer ......................... 250/221 |
| 4,407,934 A | * | 10/1983 | Kuchinsky et al. ......... 430/314 |
| 4,647,771 A | * | 3/1987 | Kato ...................... 250/237 R |
| 4,857,746 A | | 8/1989 | Kuhlmann et al. |
| 2001/0011718 A1 | | 8/2001 | Borrelli et al. |
| 2005/0141847 A1 | * | 6/2005 | Schroeder et al. .......... 385/147 |

FOREIGN PATENT DOCUMENTS

| DE | 36 33 181 | 4/1988 |
| DE | 197 33 996 | 2/1999 |
| JP | 56 75645 | 6/1981 |
| JP | 60 262475 | 12/1985 |
| JP | 11 251619 | 9/1999 |
| WO | WO 99/28971 | 6/1999 |

* cited by examiner

Primary Examiner—Stephone B. Allen
(74) Attorney, Agent, or Firm—Collard & Roe, P.C.

(57) ABSTRACT

A reflected-light sensor includes a light emitter for emitting radiation onto an object to be measured and an optical receiver for receiving the reflected radiation from the object. The sensor includes a carrier for the light emitter and the optical receiver and a glass layer arranged on the carrier. The glass layer has transparent areas arranged above the light emitter and the optical receiver and light absorbing areas located in between.

12 Claims, 2 Drawing Sheets

SENSOR DETECTING REFLECTED LIGHT AND METHOD FOR ITS MANUFACTURE

CROSS REFERENCE TO RELATED APPLICATIONS

Applicant claims priority under 35 U.S.C. §119 of German Application No. 102 09 931.6 filed Mar. 7, 2002.

1. Field of the Invention

The present invention relates to a sensor for detecting reflected light, and to a method for producing a reflected-light sensor, in connection with which the radiation emitted by a light emitter is reflected or redeflected on an object being measured, and received by an optical receiver. The radiation passes through transparent protective layers that are arranged on a carrier (or substrate).

2. The Prior Art

Optical sensors for detecting reflected light are employed in large numbers in many areas in the field of the controlling and regulating technology. They are frequently used in the form of so-called reflection-light scanners. The radiation emitted by a light emitter passes through a transparent protective layer, is remitted by the object being measured, and then is partially received in an optical receiver. Optical sensors for detecting reflected light require constructional measures in order to effectively prevent the emitted light from being directly trans-coupled through the protective layer to the receiver. Such parasitic trans-coupling, which is referred to also as optical "crosstalk", is a general problem posed by this sensor principle and determines to a large extent the achievable resolution and the usable dynamic range. In hybrid reflected-light sensors, which employ discrete emitter or receiver components, and where the light is directly optically coupled to the measured object without the use of optical wave guides, the optical separation between the emitter and the receiver is accomplished by filling the intermediate space with materials that are impermeable to light.

The drawback afflicting this solution is that the surface of the sensor is generally no longer planar and consists of different materials. Furthermore, due to the manufacturing conditions, it is not possible to reduce the distance between the components of the emitter and the components of the receiver as desired.

Reflected-light sensors that are integrated in a hybrid manner and have a surface consisting of a through-extending glass pane are particularly user-friendly. Owing to the beneficial properties of glasses such as high transparency, high hardness and good resistance to media, as well as compatibility with micro-technical batch processes that are feasible at favorable cost, new fields of application in the area of contacting measurements are opening up for such sensors. For example, fields of application are opening in the area of biotechnology and in the field of medical technology.

A hybrid element with a chip-on-chip arrangement is known from WO 99/28971, where at least one chip is arranged on a silicon substrate. This arrangement allows contacting inserted components of the construction that have electrical connections on the front and backsides, while also realizing an electrical contact between the inserted construction element and the front side of the carrier or substrate material.

SUMMARY OF THE INVENTION

It is an object of the invention to provide an arrangement for optical reflected-light sensors with planar glass panes that are integrated in a hybrid manner, and a method for producing such sensors, in connection with which the suppression of the parasitic optical trans-coupling from the emitter to the receiver can be simply and effectively accomplished.

According to the invention, this problem is solved with a reflected-light sensor in which transparent protective layers are arranged in a glass layer including transparent and light-absorbing areas. The transparent areas are arranged above a light emitter and an optical receiver, with the light-absorbing areas located in between. The problem is also solved with a method in accordance with the invention. Beneficial variations are discussed below.

The sensor for detecting reflected light as defined by the invention has a glass pane with light-absorbing areas. The shape and position of these areas allow suppressing the optical "crosstalk" from the light emitter to the photo receiver. These barriers can be produced in an advantageous manner from an ultraviolet (UV)-sensitive glass by means of micro-technical methods.

The protective layers are integrated in a layer of glass. This layer of glass has transparent and light-absorbing areas. The transparent areas are arranged above the light emitter and the light receiver, and the light-absorbing areas are disposed in between.

It is beneficial to form the layer of glass so that it extends in the form of one single piece over at least an area of the sensor. The sensor includes at least one receiver and one emitter. Of course, it is also possible for the one-piece layer of glass to extend across a number of sensor elements that are arranged one next to the other.

By stacking layers of glass one on top of the other, it is possible to arrange the transparent areas offset sideways, so that optical shutters with defined edge angles are formed.

An advantageous embodiment is obtained by connecting the layer of glass with a silicon chip accommodating the arrangement of the electronic components for emitting and detecting the light. The layer of glass may contain contacting and wiring elements.

The layer of glass with transparent and light-absorbing areas can be produced by subjecting a glass pane made of ultraviolet (UV)-sensitive glass to UV-irradiation in those areas that have to be light-absorbing, i.e. in the areas that will be disposed later in the finished reflected-light sensor next to those areas that contain the receiver and the emitter elements. A special benefit for the manufacture is obtained in that the light-absorbing areas in the layer of glass can be produced by micro-lithographic methods. The layers of glass stacked one on top of the other are advantageously connected by means of diffusion bonds.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
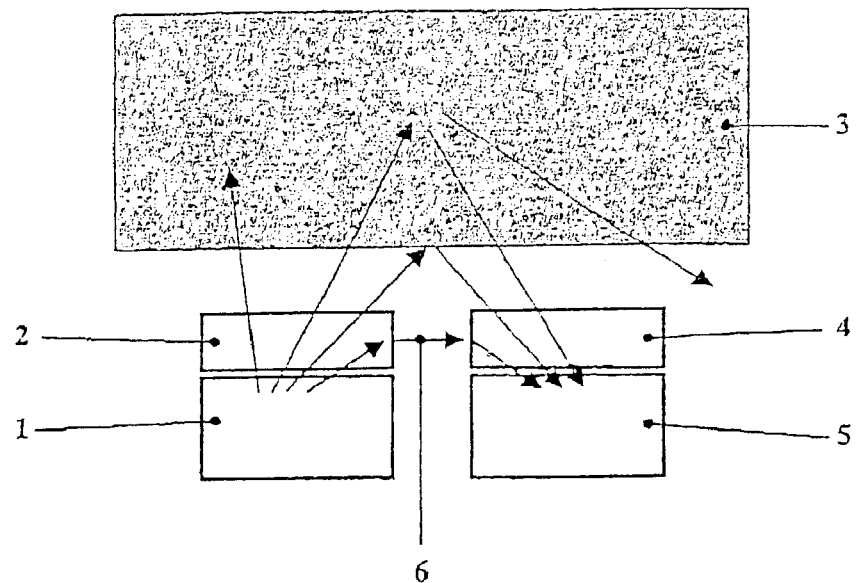
FIG. 1 is a schematic sectional representation of a reflected-light sensor.

Referring now in detail to the drawings, FIG. 1 shows the basic structure of a hybrid sensor for detecting reflected light. The radiation emitted by the light emitter 1 penetrates the transparent protective layer 2 of the emitter, is then reflected on the object 3 being measured, and partly passes through the protective layer 4 of the receiver and to the optical receiver 5. Between transparent protective layers 2 and 4, an undesirable component of the emitted light passes via the coupling path 6 directly from the light emitter to the receiver 5.

Figure 2:
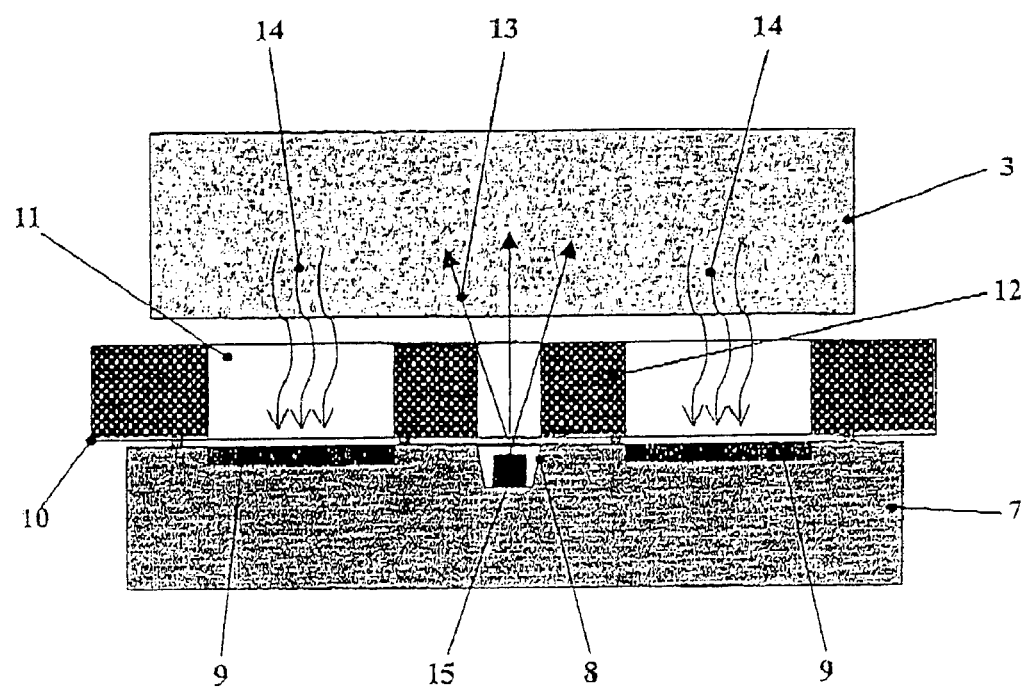
FIG. 2 is an arrangement with a layer of glass containing light-absorbing and transparent areas.

FIG. 2 shows a reflected-light sensor that is integrated in a hybrid manner by a cross-sectional view, where the protective layer of glass 10 has been produced from UV-sensitive glass. Such UV-sensitive types of glass are commercially available and are offered in the market, for example under the trade name FOTURAN® by the firm SCHOTT Glaswerke of Mainz, Germany. UV-sensitive glasses can be changed from the originally transparent to a light-absorbing condition by exposing them to UV radiation and a subsequent tempering treatment. Using suitable lithographic masks of the type commonly employed in the field of microelectronics, the exposure can be limited to defined areas of the glass. In this way, the exposure and tempering process transforms the picture (or image) content of the mask with very high accuracy and detail resolution transversely across the total thickness of the glass into the ceramic and highly light-absorbing areas 12. With the help of a corresponding mask layout, it is possible in this manner to produce in the glass optical shutters with micro-technical precision, which effectively suppress the parasitic trans-coupling from the light emitter to the light receiver in the reflected-light sensor.

The reflected-light sensor has a carrier 7 in the form of a silicon chip with the anisotropically etched wells 8 and the integrated photodiodes 9, which are advantageously arranged symmetrically in relation to the wells 8. The light emitter, preferably in the form of one or more of LED's 15, is mounted in the well 8 in the form of a bare chip. The complete silicon chip is soldered to the glass carrier 10 by means of the well-known flip-chip technology.

Glass layer 10 contains the transparent areas 11 and the absorbing areas 12 that have been produced by the exposure to UV and subsequent tempering described above. The soldered side of glass layer 10 serves at the same time as the wiring plane for contacting the active elements of the construction on silicon chip 7, or other elements in addition to silicon chip 7. By producing the absorbing areas that act as optical shutters, it is assured that the emitted radiation 13 can exclusively impact on the measured object 3 and the photodiodes 9 in the form of the reflected radiation 14, so that optical crosstalk is effectively suppressed in this way.

Figure 3:
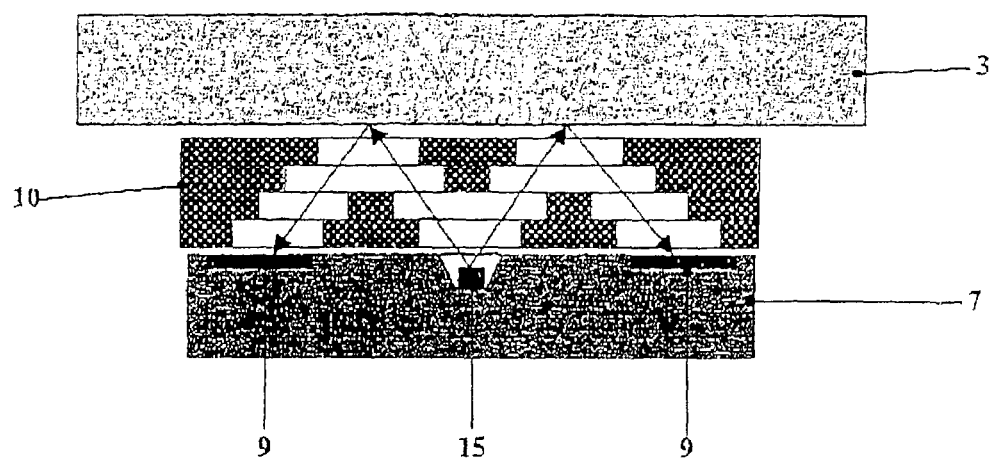
FIG. 3 is an arrangement with a three-dimensional embodiment of the glass layer areas.

FIG. 3 shows that two or more glass layers 10 can be stacked up. This arrangement allows optical shutters to be produced for defined angles in radiation. For this purpose, the picture elements are offset against each other from one glass plane to the next in the course of the exposure to UV. After the tempering process, edges are obtained between the transparent and the light-absorbing volumes of the glass that are stepped like a staircase. Such a quasi-three-dimensional embodiment of the shutters can be beneficially used for suppressing the axial radiation of LED's and for fading out usable light for total-reflection applications.

Accordingly, while a few embodiments of the present invention have been shown and described, it is to be understood that many changes and modifications may be made thereunto without departing from the spirit and scope of the invention as defined in the appended claims.

What is claimed is:

1. A reflected-light sensor including a light emitter for emitting radiation onto an object to be measured and an optical receiver for receiving radiation from the object, comprising a carrier for said light emitter and said optical receiver and a glass layer arranged on said carrier having a total thickness, said glass layer having transparent areas and light-absorbing areas arranged within said glass layer and extending across the total thickness of the glass layer, wherein said transparent areas are arranged above said light emitter and said optical receiver and said light-absorbing areas are located in between said transparent areas and around said transparent areas.

2. The reflected-light sensor according to claim 1 comprising at least one sensor area formed by at least one receiver and at least one emitter and wherein said glass layer extends in one piece across said at least one sensor area.

3. The reflected-light sensor according to claim 1, wherein at least two glass layers are stacked one on top of the other, with their transparent areas offset sideways, to produce optical shutters with defined edge angles.

4. The reflected-light sensor according to claim 1 wherein said carrier comprises a silicon chip accommodating electronic components for emitting and detecting light and said glass layer is electrically connected to said silicon chip.

5. The reflected-light sensor according to claim 1, wherein said glass layer contains contacting and wiring elements.

6. A method for producing a glass layer having transparent and light-absorbing areas for a reflected-light sensor comprising the following steps:
   (a) exposing to UV radiation a UV-sensitive glass layer having a total thickness in regions of light-absorbing areas to be created and arranged between receiver and emitter areas of a reflected-light sensor and around the receiver and emitter areas; and
   (b) tempering said UV-sensitive glass layer to transform the exposed regions to light-absorbing areas that extend across the total thickness of the glass layer.

7. The method according to claim 6, wherein the light-absorbing areas in the glass layer are produced by micro-lithographic methods.

8. The method according to claim 6, wherein at least two glass layers are stacked one on top of the other and are connected with each other by diffusion bonds.

9. A reflected-light sensor including a light emitter for emitting radiation onto an object to be measured and an optical receiver for receiving said radiation reflected from the object, comprising a carrier for said light emitter and said optical receiver comprising a silicon chip accommodating electronic components for emitting and detecting light and a UV-sensitive glass layer arranged on said carrier and electrically connected to said silicon chip, said glass layer having transparent areas arranged above said light emitter and said optical receiver and light-absorbing areas located in between said transparent areas, wherein said light-absorbing areas are produced by locally limited ultraviolet radiation in a micro-lithographic process and subsequent tempering.

10. A reflected-light sensor including a light emitter for emitting radiation onto an object to be measured and an optical receiver for receiving said radiation reflected from the object, comprising a carrier for said light emitter and said optical receiver comprising a silicon chip accommodating electronic components for emitting and detecting light and a glass layer arranged on said carrier and electrically connected to said silicon chip, said glass layer having transparent areas arranged above said light emitter and said optical receiver and light-absorbing areas located in between said transparent areas.

11. A reflected-light sensor including a light emitter for emitting radiation onto an object to be measured and an optical receiver for receiving said radiation reflected from the object, comprising a carrier for said light emitter and said optical receiver and a glass layer arranged on said carrier having transparent areas arranged above said light emitter and said optical receiver and light-absorbing areas located in between said transparent areas; wherein at least two glass layers are stacked one on top of the other, with their transparent areas offset sideways, to produce optical shutters with defined edge angles.

12. A method for producing a UV-sensitive glass layer for a reflected-light sensor comprising the following steps:
   (a) exposing a UV-sensitive glass layer in selected areas corresponding to areas between receiver and emitter areas in a reflected-light sensor; and
   (b) tempering said UV-sensitive glass layer to produce light-absorbing areas in said selected areas; wherein at least two glass layers are stacked one on top of the other and are connected with each other by diffusion bonds.

* * * * *